(No Model.) 2 Sheets—Sheet 1.
W. H. FILER.
STEAM COOKING APPARATUS.
No. 397,709. Patented Feb. 12, 1889.
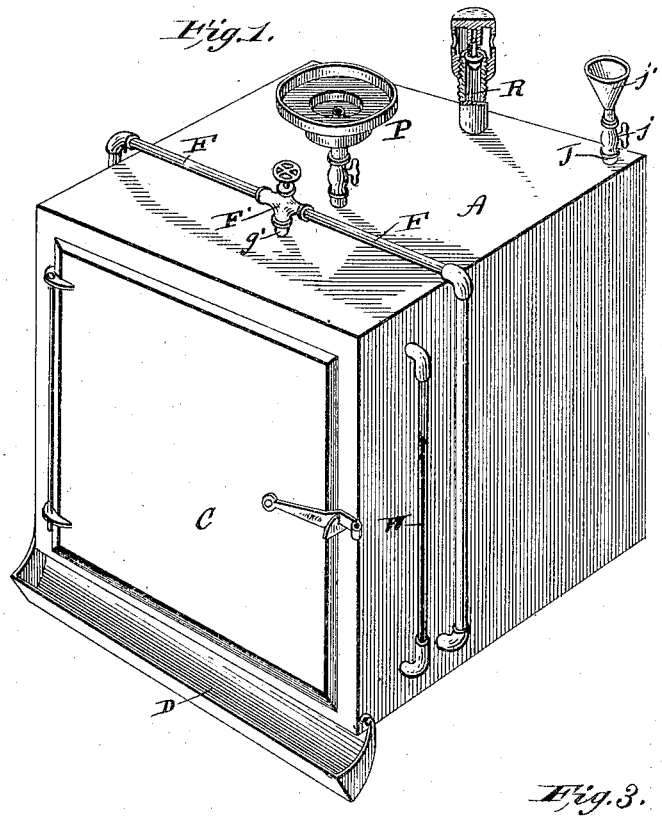
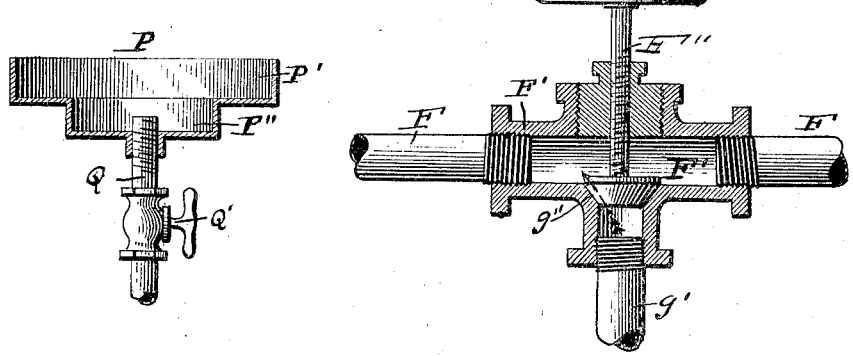
WITNESSES
INVENTOR
W. H. Filer
By C. M. Alexander
Attorney.

(No Model.) 2 Sheets—Sheet 2.

W. H. FILER.
STEAM COOKING APPARATUS.

No. 397,709. Patented Feb. 12, 1889.

WITNESSES
INVENTOR.
Attorney.

UNITED STATES PATENT OFFICE.

WILLIAM H. FILER, OF GROVE CITY, PENNSYLVANIA.

STEAM COOKING APPARATUS.

SPECIFICATION forming part of Letters Patent No. 397,709, dated February 12, 1889.

Application filed June 2, 1888. Serial No. 275,839. (No model.)

*To all whom it may concern:*

Be it known that I, WILLIAM H. FILER, a citizen of the United States, residing at Grove City, in the county of Mercer and State of Pennsylvania, have invented certain new and useful Improvements in Steam Cooking Apparatus, of which the following is a specification, reference being had therein to the accompanying drawings.

My invention relates to an improved portable steam cooking apparatus adapted to be placed upon any of the well-known ranges, cooking-stoves, heaters, or upon gas-stoves or other heaters; and it consists, essentially, in a double-wall steam-cooker which is provided with certain novel instrumentalities, all of which will be fully understood from the following description and claims, taken in connection with the annexed drawings, in which—

Figure 4:
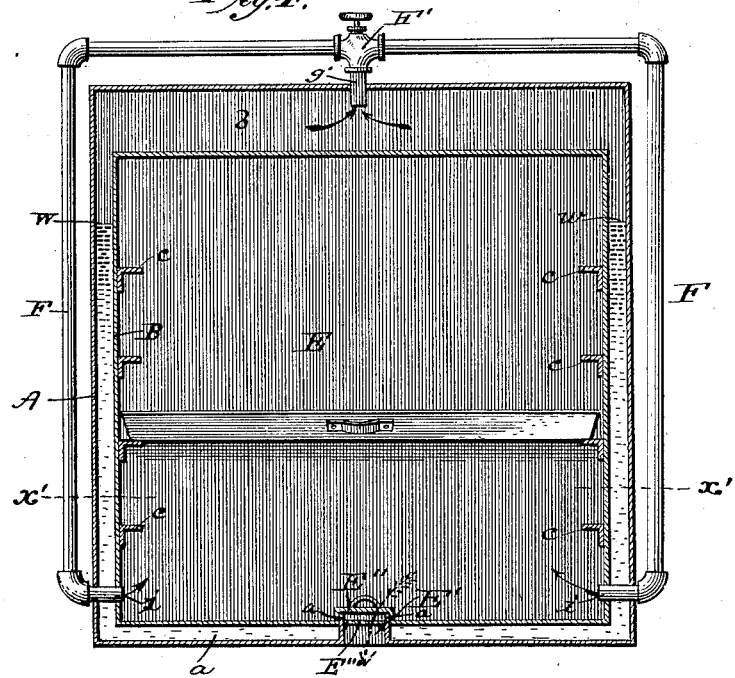
Figure 5:
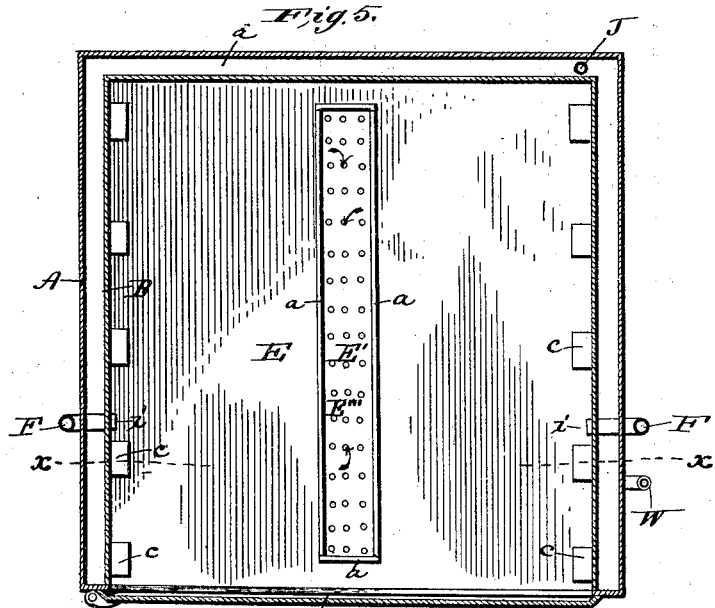

Figure 1 is a perspective view of my improved steam-cooker, the safety-valve being shown in section. Fig. 2 is a detail vertical sectional view of an attachment to the cooker for the purpose of heating a pot or kettle or analogous article; Fig. 3, a detail sectional view of the valve and portions of the adjacent pipes, the valve controlling the admission of steam to the oven; Fig. 4, a vertical sectional view of the cooker, taken on the line $x\,x$ of Fig. 5; and Fig. 5 a horizontal sectional view of the same, taken on line $x'\,x'$ of Fig. 4, the cover to the opening in bottom of cooker being removed.

In the annexed drawings I have represented a cubical steam-cooker; but it will be obvious from what follows that this form of cooker is simply optional, as it may be made in any other suitable shape.

The drawings show a double-wall steam-cooker which is composed of an outer wall or casing, A, and an inner wall, B, between which is a space, the lower part, $a$, of which space is adapted to contain water, and the upper part, $b$, steam. The water-line is indicated by $w$ on the drawings hereto annexed; but for practical purposes I employ a glass gage, W, similar to a steam-boiler gage, which will expose to the eye at any time the height of the water between the walls A B of the steam-cooker.

It will be observed by reference to Fig. 4 that I leave a greater space between the top horizontal walls of the device than I do at the sides and bottom. This is for the purpose of accumulating comparatively a large amount of steam in proportion to the volume of water used.

C designates the door of the device, and D a drip-pan suitably suspended beneath the front end of the same for catching any water of condensation which may leak out of the oven.

E designates the oven proper, which is within the inner wall, and preferably provided on its interior with brackets $c$ to support removable pans, grate-bars, &c.

Formed through the bottom of the cooker, and preferably extending longitudinally thereof, is a passage or slot, E', which communicates with the oven E, and is provided, preferably, with a raised flange, $a'$, extending entirely around its edge, as shown in Fig. 4, the walls of the passage and the flange $a'$ being formed in this instance of vertical continuations of the bottom of the cooker. Over this opening E' is placed a flanged cap, E'', which may be removed at will to allow the vapors and odors from the oven to pass out through the passage into the open air, or into the stove, as the case may be. By means of this removable cover and opening it is obvious that I am enabled to regulate the outflow of steam from the bottom of the oven, and thereby concentrate the heat for baking at and near the lowest part of the oven. At the same time the dryest heat for other cooking purposes may be at and near the highest part of the oven. Inserted in the passage E' is a numerously-perforated diaphragm, E''', which has a tendency to prevent the flames and products of combustion from the stove upon which the cooker may be placed from entering the oven when the cover E'' is removed.

J designates a pipe which preferably extends to the bottom of the space between two vertical walls, A B, and above the highest horizontal wall, A, and is provided with a cock, $j$, and a removable funnel, $j'$. It is through this pipe that water is supplied to the cooker, the water-line being indicated exteriorly by the glass gage above described.

The letters F F' indicate two pipes which extend from near the bottom of the oven (from the points $i\,i$ on opposite sides of the same) out through the walls A and B and up over the top of the cooker, where they are connected together and to a short vertical pipe, $g'$, by means of a T-coupling, F', the said vertical branch $g'$ extending through the walls A B into the steam-space $b$, as shown in Fig. 4.

The letter F designates a valve adapted to close on a beveled seat, $g''$, over the vertical portion of the T-coupling, as shown in Fig. 3, and shut off the supply of steam to the oven. By means of this valve it will be obvious that the supply of steam to the oven through the pipes E may be regulated to suit the character of cooking desired.

The letter P designates an attachment adapted for heating coffee-pots or other vessels by steam from the cooker. This attachment consists, preferably, of a circular pan, P', provided with a central depressed portion, P'', into which is extended the upper end of a supporting-pipe, Q, this pipe Q being provided with a regulating-cock, Q', and communicating with the steam-chamber $b$ of the cooker. When a vessel is set in the pan P' and the cock Q' is opened, the steam will pass into and completely fill the depressed portion P'', and thus be brought into direct contact with the vessel to be heated.

If I mount my improved cooker upon an ordinary cooking-stove, it is evident that it may be of such shape as to be fitted into the elliptical or circular holes of the stove or to rest upon the top plate thereof. I thus obtain dry heat, the temperature of which is regulated by the ordinary dampers and registers of such a stove. I also utilize this dry heat for the production of steam and conduct the steam, in regulated quantities and degrees of heat, directly into the oven E for cooking by moist heat, from which oven the heated gases, fumes, &c., are or may be carried into the fire-box of the common heater or stove. I have provided an ordinary safety-valve or flow-off, R, which is automatic in operation, for regulating the steam-pressure between the walls A B of the cooker.

Having thus fully described my invention, what I claim as new, and desire to secure by Letters Patent, is—

1. The combination of the casing A of the cooker, the oven B, somewhat smaller than the casing and inserted in one side of the said cooker, whereby a water and steam space is formed around the oven, the said casing and oven having formed through their bottoms a flanged passage, E, a perforated diaphragm, E''', inserted in the said passage, a flanged removable cover, E'', placed over the said passage, and valved steam-conducting pipes connecting the steam-space of the cooker with the oven, substantially as described.

2. The combination of the casing, the oven B, smaller than the casing and inserted in one side of the cooker, whereby a water and steam space is formed around the oven, the said casing and oven having formed through their bottoms a flanged passage, a removable cover placed over the said passage, and valved steam-conducting pipes connecting the steam-space of the cooker with the oven, substantially as described.

In testimony whereof I affix my signature in presence of two witnesses.

WILLIAM H. FILER.

Witnesses:
W. E. WALLS,
A. B. THOMPSON.